United States Patent
Rabinovich et al.

(10) Patent No.: US 10,432,336 B2
(45) Date of Patent: Oct. 1, 2019

(54) SYSTEM AND METHOD OF SYNCHRONIZING A DISTRIBUTED CLOCK IN A PACKET-COMPATIBLE NETWORK

(71) Applicant: ADVA Optical Networking SE, Munich (DE)

(72) Inventors: Michael Rabinovich, Modiin (IL); Moshe Tofef, Netanya (IL)

(73) Assignee: ADVA Optical Networking SE, Munich (DE)

( * ) Notice: Subject to any disclaimer, the term of this patent is extended or adjusted under 35 U.S.C. 154(b) by 81 days.

(21) Appl. No.: 15/643,613

(22) Filed: Jul. 7, 2017

(65) Prior Publication Data

US 2018/0013508 A1   Jan. 11, 2018

(30) Foreign Application Priority Data

Jul. 11, 2016   (EP) .................................. 16178886

(51) Int. Cl.
   *H04J 3/06*   (2006.01)
(52) U.S. Cl.
   CPC .......... *H04J 3/0682* (2013.01); *H04J 3/0667* (2013.01); *H04J 3/0679* (2013.01)
(58) Field of Classification Search
   CPC ...... H04J 3/0667; H04J 3/0679; H04J 3/0682; H04J 3/0673
   See application file for complete search history.

(56) References Cited

U.S. PATENT DOCUMENTS

| | | | |
|---|---|---|---|
| 9,998,247 B1 * | 6/2018 | Choudhury | H04J 3/0685 |
| 2011/0255546 A1 | 10/2011 | Le Pallec et al. | |
| 2011/0261917 A1 | 10/2011 | Bedrosian | |
| 2013/0215889 A1 | 8/2013 | Zheng et al. | |
| 2014/0119390 A1 * | 5/2014 | Rabinovich | H04L 43/0852 370/503 |
| 2015/0171980 A1 | 6/2015 | Bui et al. | |
| 2015/0113174 A1 | 8/2015 | Yang et al. | |

FOREIGN PATENT DOCUMENTS

| | | |
|---|---|---|
| EP | 2333993 A1 | 6/2011 |
| WO | 2006/029511 A1 | 3/2006 |

OTHER PUBLICATIONS

Patrick Loschmidt Et Al: "white rabbit sensor / actuator protocol for the CERN LHC particle accelerator", Sensors, 2009 IEEE, IEEE, Piscataway, NJ, USA, Oct. 25, 2009 (Oct. 25, 2009), pp. 781-786.

* cited by examiner

*Primary Examiner* — Hoon J Chung
(74) *Attorney, Agent, or Firm* — Wiggin and Dana LLP; Gregory S. Rosenblatt; Rikesh P. Patel (57) ABSTRACT

There are provided a clock node, a controller, a method of operating the clock node and a method of operating the controller in a time distribution network (TDN) comprising the controller being in data communication with the clock nodes via a control path. The method of operating the clock node comprises: sending, from the clock node via the control path to the controller, a first timestamp-related data; receiving, by the clock node via the control path from the controller, clock-recovery control data generated by the controller using the first timestamp-related data received from the clock node; processing the received clock-recovery control data to extract data usable for phase and frequency recovery; and using the extracted data to steer frequency and phase characterizing the clock node.

11 Claims, 9 Drawing Sheets

Figure 1a

PRIOR ART

Figure 1b

PRIOR ART

SYSTEM AND METHOD OF SYNCHRONIZING A DISTRIBUTED CLOCK IN A PACKET-COMPATIBLE NETWORK

CROSS-REFERENCES TO RELATED APPLICATIONS

The present application claims benefit from European Patent Application No. 16178886.4 filed on Jul. 11, 2016 and incorporated hereby by reference in its entirety.

TECHNICAL FIELD

The presently disclosed subject matter relates to synchronization of nodes in a telecommunication network and, more particularly, to synchronizing a distributed clock in a packet-compatible network.

BACKGROUND

Proper operation of a telecommunication network requires time and/or frequency synchronization between various entities therein. Synchronization can be achieved, for example, by exchange timing information (time-transfer) across the network. A particular protocol for exchanging timing information over a packet-compatible network is the IEEE 1588 Precision Time Protocol (PTP) usable for frequency and phase synchronization.

For purpose of illustration only, the following description is provided for PTP-based synchronization. Those skilled in the art will readily appreciate that the teachings of the presently disclosed subject matter are, likewise, applicable to other time-transfer protocols and/or procedures that are usable for the exchange of time-related information in a packet-compatible network.

Through exchange of PTP packets, which include timestamps carried inside, PTP enables synchronization between a master clock node, which has access to an accurate time source (e.g. Global Positioning System) and slave clock nodes having less accurate clocks. Timestamps are usable for frequency and phase recovery between the clocks. For example, timestamps can be used to measure the roundtrip delay between the master node and a slave node. Knowledge of this path delay may then be used to synchronize a clock at the slave node with a master clock at the master node, based on a synchronization or timing reference received by the slave node from the master node. According to PTP, synchronization at the slave clock can be achieved without requiring changes in one or more intermediate nodes. In addition, boundary clocks and/or transparent clocks may be used, for example, to reduce effects of propagation delay variations and/or other delays.

Problems of synchronization of telecommunication networks by exchanging specialized messages between master and slave clocks have been recognized in the conventional art and various techniques have been developed to provide solutions, for example:

US Patent Application No. 2015/0171980 discloses a method for synchronizing distributed clocks by the Precision Time Protocol. The method includes sending a Sync message from a first peer-to-peer transparent clock to a second peer-to-peer transparent clock, estimating the path delay of the transmission path travelled by the synchronization message from the first to the second peer-to-peer transparent clocks, and taking this path delay into account for updating the time information carried by a synchronization message. The estimating includes creating a list of the network addresses of the network interfaces traversed by the synchronization message; ordering the first list into the order in which the network interfaces have been traversed by the Sync message; creating a second list by reversing the order of the first list; communicating the second list to the second peer-to-peer transparent clock; and using the mechanism available at the transport protocol level, to constrain the respective paths of Pdelay_Req and Pdelay_Resp messages so that their respective paths map to the second and first ordered lists of traversed interfaces.

US Patent Application No. 2015/0113174 discloses an intelligent supervisor located at a management node in the PTP network and configured to determine the PTP roles and configuration of the client nodes. The intelligent supervisor communicates with intelligent supervisor agents located at client nodes in the PTP network. The supervisor agents at the client nodes feed back information, such as the PTP properties of the client nodes, to the supervisor. The supervisor analyses the data to determine the roles and appropriate configuration for the client nodes.

US Patent Application No. 2013/0215889 discloses a data network node implementing a time-transfer protocol (e.g. Precision Time Protocol), wherein low-touch PTP packet processing functions moved from a PTP processing unit into an efficient network processor. An example network node includes a time-transfer protocol processing unit that generates negotiation messages and management messages for a time-transfer protocol and forwards said negotiation and management messages to one or more clients. The network node also includes a separate network processor unit, which is adapted to: receive a configuration message from the time-transfer protocol processing unit, the configuration message comprising stream configuration data for a first type of repetitive time-transfer message; generate a plurality of time-transfer messages according to the first type of repetitive time-transfer message, using the stream configuration data; and forward said plurality of time-transfer messages to the one or more remote network nodes, via the one or more line ports.

US Patent Application No. 2011/0261917 discloses a slave node in a packet network which achieves time synchronization with a master node by implementing a packet-layer synchronization procedure, such as the IEEE1588 precision timing protocol (PTP), to set the slave's local time based on the master's time. The slave's local time is then maintained by implementing a physical-layer synchronization procedure, such as synchronous Ethernet, without relying on the packet-layer synchronization procedure. The packet-layer synchronization procedure may be selectively employed to adjust the slave's local time (if needed) after significant periods of time (e.g., substantially greater than one second). Both the packet-layer synchronization procedure and the physical-layer synchronization procedure are traceable to a common reference timescale (e.g., UTC). Depending on the implementation, the packet-layer synchronization procedure can be, but does not have to be, terminated when not being employed to adjust the slave's local time.

The references cited above teach background information that may be applicable to the presently disclosed subject matter. Therefore the full contents of these publications are incorporated by reference herein where appropriate for appropriate teachings of additional or alternative details, features and/or technical background.

GENERAL DESCRIPTION

There is provided a time distribution network (TDN) operating in compliance with a time-transfer protocol and a method of operating thereof. The network comprises a plurality of first clock nodes and a controller being in data communication with the first clock nodes via a control path, the first clock nodes and the controller configured in accordance with the presently disclosed subject matter. Optionally, the network can comprise second clock nodes (referred to hereinafter also as legacy clock nodes) with no data communication with the controller via the control path, the second clock node being in data communication with the first clock nodes via a data path.

In accordance with certain aspects of the presently disclosed subject matter, there is provided a method of operating a first clock node. The method comprises: sending, from the clock node via the control path to the controller, a first timestamp-related data; receiving, by the clock node via the control path from the controller, clock-recovery control data generated by the controller using the first timestamp-related data received from the clock node, processing the received clock-recovery control data to extract data usable for phase and frequency recovery; and using the extracted data to steer frequency and phase characterizing the clock node.

The method can further comprise: receiving, by the first clock node, master PTP (Precision Time Protocol) messages and generating, in response, slave PTP messages; extracting master timestamps from the received messages and slave timestamps from the generated messages; and processing the obtained timestamps to generate the first timestamp-related data informative of master timestamps received by the clock node and slave timestamps generated by the clock node, the first timestamp-related data to be sent to the controller.

Optionally, the method can further comprise: receiving, by the first clock node, PTP synchronizing messages from a second clock node; using the received PTP synchronizing messages to generate a second timestamp-related data associated with the second clock node; and sending, from the first clock node via the control path to the controller, the second timestamp-related data, wherein the second timestamp-related data are usable by the controller for monitoring clock recovery quality of the second clock node.

In accordance with further aspects of the presently disclosed subject matter, the method can further comprise sending, from the first clock node via the control path to the controller, PTP announce messages associated with the first clock node.

Further, the method can comprise: receiving, by the first clock node, PTP announce messages from a second clock node; and forwarding the received PTP announce messages to the controller via the control path.

In accordance with other aspects of the presently disclosed subject matter, there is provided a first clock node configured to operate in the TDN comprising a controller being in data communication with the first clock node via a control path, the first clock node further configured to operate in accordance with the method disclosed above.

In accordance with other aspects of the presently disclosed subject matter, there is provided a method of operating the controller being in data communication with one or more first clock nodes via a control path. The method comprises: continuously receiving, by the controller via the control path from each of the one or more first clock nodes, first timestamp-related data, the first timestamp-related data received from a given clock node being informative of master and slave timestamps associated with the given clock node; using the received first timestamp-related data associated with a given clock node to generate, for each of the one or more clock nodes, clock-recovery control data with respect to the given clock node, the generated clock-recovery control data comprising data usable for phase and frequency recovery; and continuously sending the generated clock-recovery control data, via the control path, to each of the one or more clock nodes.

The method can further comprise: continuously receiving, by the controller via the control path from the one or more first clock nodes, second timestamp-related data, the second timestamp-related data received from a given first clock node being informative of master and slave timestamps associated with a second clock node operating in the TDN with no data communication with the controller via the control path, wherein the second timestamp-related data are generated by the given first clock node using PTP synchronizing messages it receives from the second clock node; and continuously monitoring, by the controller, clock recovery quality of the second clock node using the received second timestamp-related data.

In accordance with further aspects of the presently disclosed subject matter and, optionally, in combination with any of the appropriate above aspects, the method can further comprise processing timestamp-related data received by the controller to generate clock-recovery accuracy metrics of the one or more first clock nodes and, optionally, of one or more second clock nodes.

In accordance with further aspects of the presently disclosed subject matter and, optionally, in combination with any of the appropriate above aspects, the method can further comprise: continuously receiving, by the controller via the control path from each of the one or more first clock nodes, first PTP announce messages generated by the one or more first clock nodes, each first PTP announce message associated with a clock port of respective first clock node; processing, at least, the received first PTP announce messages using techniques defined by BMCA (Best Master Clock Algorithm) protocol to continuously generate a clock distribution topology to be implemented; and sending to the one or more first clock nodes configuration commands specifying quality and priority of respective PTP ports in accordance with the generated clock distribution topology.

Optionally, when the TDN comprises one or more second clock nodes, the method can further comprise: continuously receiving, by the controller via the control path from the one or more first clock nodes, second PTP announce messages generated by the one or more second clock nodes being in data communication with the one or more first clock nodes via the data path, each second PTP announce message associated with a clock port of respective second clock node; and continuously generating the clock distribution topology using processing the received first PTP announce messages together with the received second PTP announce messages.

Continuously generating the clock distribution topology can further comprise processing timestamp-related data received by the controller and/or data informative of pre-defined network topology and/or the clock-recovery accuracy metrics generated by the controller.

In accordance with other aspects of the presently disclosed subject matter, there is provided the controller configured to operate in the TDN in accordance with the method disclosed above.

Among advantages of certain embodiments of presently disclosed subject matter is enabling clock recovery on nodes with limited CPU resources available for clock recovery; capability of seamless update of clock recovery algorithm(s); capability of adopting clock recovery algorithm in accordance with traceable network topology changes, etc.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "sending", "receiving", "representing", "comparing", "generating", "assessing", "matching", "updating", "using" or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the controller, the clock agent and respective parts thereof disclosed in the present application.

The terms "non-transitory memory" and "non-transitory storage medium" used herein should be expansively construed to cover any volatile or non-volatile computer memory suitable to the presently disclosed subject matter.

The operations in accordance with the teachings herein may be performed by a computer specially constructed for the desired purposes or by a general-purpose computer specially configured for the desired purpose by a computer program stored in a computer readable storage medium.

Embodiments of the presently disclosed subject matter are not described with reference to any particular programming language. It will be appreciated that a variety of programming languages may be used to implement the teachings of the presently disclosed subject matter as described herein.

Figure 1A:
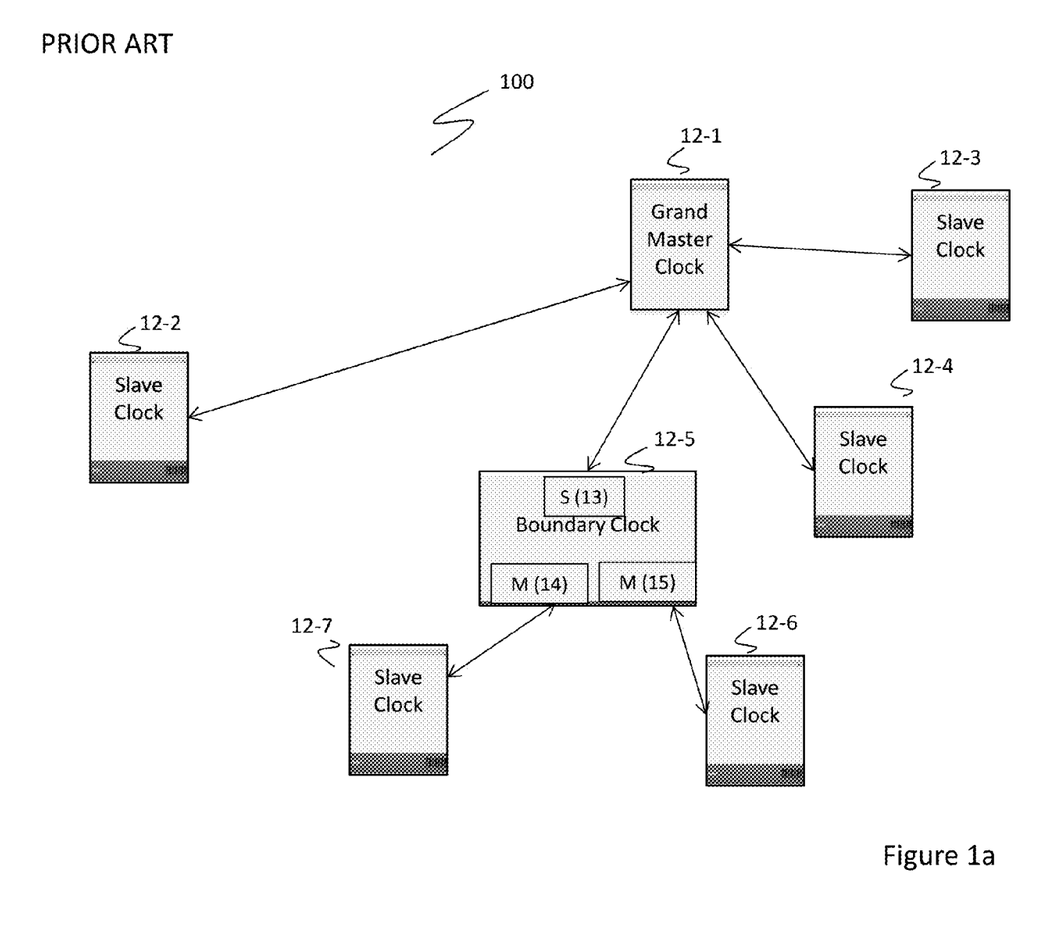
FIG. 1a illustrates a generalized schematic architecture of an exemplary time distribution network implementing the Precision Time Protocol (PTP) as known in prior art.

Bearing this in mind, attention is drawn to FIG. 1a schematically illustrating an exemplary time distribution network 100 including a plurality of interconnected clock nodes denoted as 12-1-12-7 and implementing the Precision Time Protocol (PTP) as known in prior art. Clock nodes correspond to network nodes (not shown) of an underlying packet-enabled communication network. The illustrated time distribution network 100 of FIG. 1a includes two interconnected segments (denoted 10 and 11). In accordance with IEEE 1588 standards, clock distribution in the network 100 is implemented in a hierarchical manner.

Clock nodes 12-1-12-4 and 12-6-12-7 are ordinary nodes with single network connection and each can bear a clock operating as either a source of (master) or destination for (slave) a synchronization reference. A clock operating in a master mode is referred to hereinafter as a master clock residing on the node and a clock operating in a slave mode is referred to hereinafter as a slave clock residing on the node. A boundary node 12-5 has multiple network connections (illustrated as slave port 13 and master ports 14 and 15). Time distribution network can further comprise transparent clocks (not shown) associated with network equipment used to convey PTP messages. The transparent clocks modify PTP messages and correct respective timestamps as the messages pass through respective network equipment.

A hierarchical structure of clock distribution can be dynamically configured by algorithms enabling selection of the best clock. For example, dynamic configuration of clock hierarchy and selecting a grandmaster can be provided by the Best Master Clock (BMC) algorithm defined by IEEE 1588-2008 and usable for building a clock hierarchy and selecting the grandmaster. The BMC algorithm uses announce messages to compare data (e.g. clock quality, priority, etc.) characterizing two clocks to determine which data characterizes the better clock, and performs a distributed selection of the best candidate clock. A synchronization master is selected for each of the network segments in the system. A root timing reference clock (referred to hereinafter as "grandmaster") transmits synchronization information to the clocks residing on its network segment. The boundary clocks with a presence on that segment then relay accurate time to the other segments to which they are also connected.

For purpose of illustration, node 12-1 is currently configured to be the source of a synchronization reference, i.e. to serve as PTP grandmaster and to provide the root timing reference in the entire network. End nodes 12-2-12-7 are currently configured to be the destinations of a synchronization reference, i.e. to operate as PTP slave nodes. In the illustrated example, node 12-1 transmits time-related information to slave clocks residing on its network segment (nodes 12-2-12-5). These slave clocks include boundary clock (node 12-5), which can then transfer synchronization-related data to clocks of other nodes residing on respective interconnected network segment (nodes 12-6-12-7) for which the boundary clock serves as master.

The exemplary PTP-based time distribution network 100 operates on top of communication network (not shown) which may have ring, bus, tree, star, or mesh topologies, or a combination of different topologies.

Figure 1B:
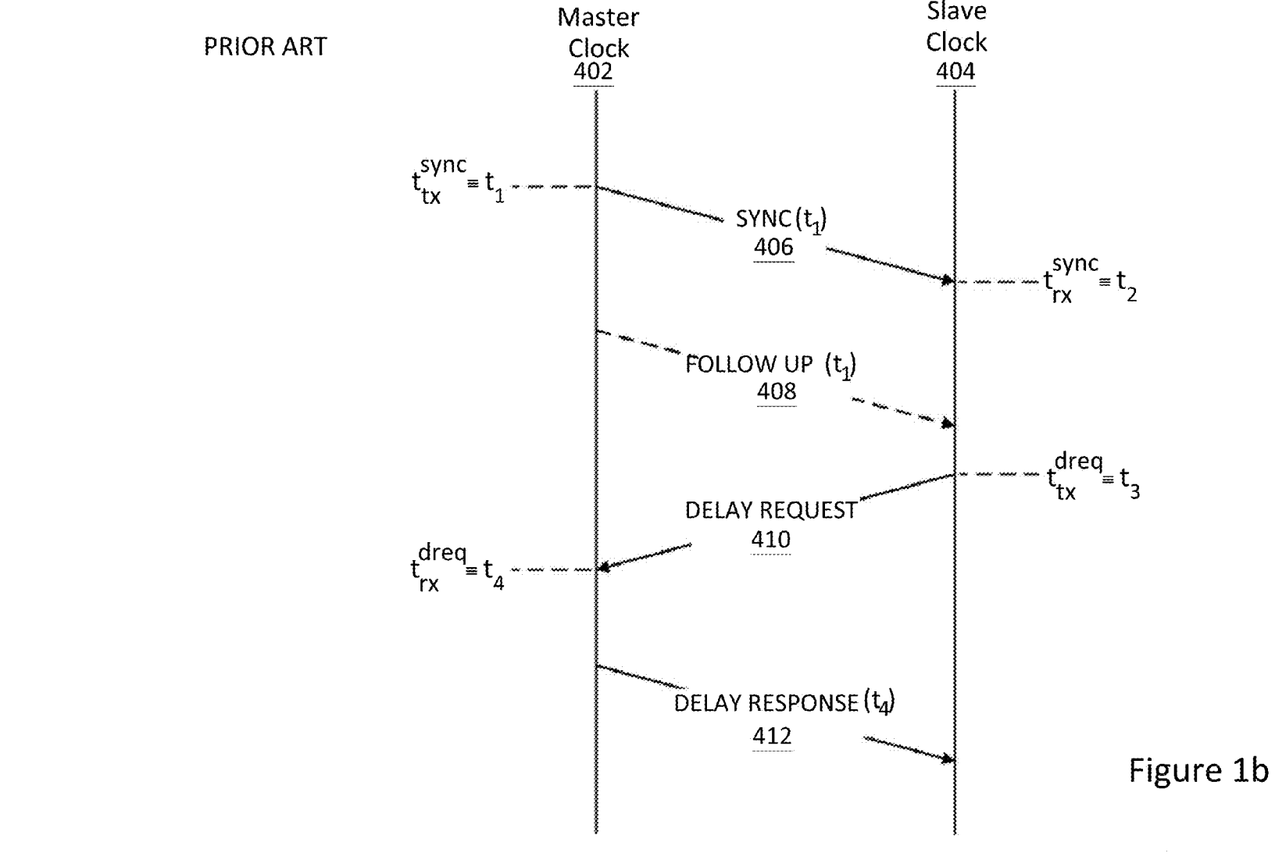
FIG. 1b illustrates a clock synchronization procedure in accordance with the PTP protocol as known in prior art.

Referring to FIG. 1b, there is illustrated a simplified sequence of message exchange between the master clock and one of slave end-nodes when operating the PTP protocol as known in prior art. FIG. 1b provides a pictorial representation of SYNC, SYNC FOLLOW UP, DELAY RESPONSE, and DELAY REQUEST messages and the associated timing information that are exchanged between a master clock 102 and a slave clock 104. SYNC message 106 comprises embedded by the master clock timestamp, $t_{tx}^{sync}$ (referred to hereinafter also as $t_1$), which represents the time at which the transmission of the SYNC message 106 was initiated. The SYNC message 106 is received at a certain time, $t_{rx}^{sync}$ (referred to hereinafter also as $t_2$), by the receiving slave clock 104. Since $t_2$ is measured by the slave clock, the value of $t_2$ can be less accurate than $t_1$ measured by the master clock. Equation (1) expresses the relationship between the time values $t_1$ and $t_2$ in terms of the network transit delay ($\Delta t_{delay}^{sync}$) and the time offset ($\Delta t_{offset}$) between the slave clock measurement and the master clock measurement: $t_2 = t_1 + \Delta t_{delay}^{sync} + \Delta t_{offset} = t_1 + \Delta t^{sync}$ (1).

Optionally (e.g. when the master clock hardware does not support inclusion of timestamp $t_1$ in the SYNC message 106), a highly accurate hardware measurement of the timestamp, $t_1$, can be transferred not within the sync packet itself, but within a separate SYNC FOLLOW UP message 108.

The slave clock sends to the master clock DELAY REQUEST message 110 informative of measured by the slave clock transmission time $t_{tx}^{dreq}$ (referred to hereinafter also as $t_3$). The master clock notes the reception time, $t_{rx}^{dreq}$ (referred to hereinafter also as $t_4$) of the DELAY REQUEST message 110; it generates, in response, DELAY RESPONSE message 112 and transmits the DELAY RESPONSE message 112 to the slave clock. The DELAY RESPONSE message 112 provides the timing information $t_4$ back to the slave clock. Similar to Equation (1), the relationship between time values $t_3$ and $t_4$ can be expressed as: $t_4 = t_3 + \Delta t_{delay}^{dreq} + \Delta t_{offset} = t_1 + \Delta t^{dreq}$ (2). Subtracting Equation (2) from Equation (1) can produce the slave clock offset $\Delta t_{offset}$ indicative of time difference between the slave clock and the master clock.

The values of $t_1$, $t_4$ (collectively referred to also as master timestamps) transmitted to the slave clock 104 as part of message exchange and values $t_2$ and $t_3$ (collectively referred to also as slave timestamps) generated by the slave clock 104 are stored in a memory location accessible by the slave clock 104. The slave clock further uses the collected timestamps and generates clock-recovery data usable for clock (i.e. frequency and/or phase) recovery.

By way of non-limiting example, the time offset can be calculated based on an the assumption that the path delay in the forward direction (from the master node to the slave node) is the same as the path delay in the reverse direction (from the slave node to the master node). However, in practice, many networks (e.g. in packet-based backhaul networks, packet-based wireless networks, enterprise Ethernet networks, etc.) introduce delay that can be unpredictable, asymmetrical and/or highly variable. Accordingly, in order to cope with these variations and to robustly and precisely negate the errors caused by delay variability, the slave clock is required to apply more complicated recovery algorithms, some of such algorithms being well known in the art (e.g. clock filter algorithm for NTP (network time protocol) specified in RFC5905 by IETF).

In addition to exchange of synchronizing messages detailed above with reference to FIG. 1B, PTP supports other synchronizing messages (e.g. for peer-to-peer synchronization). PTP also supports other announce and signaling messages usable to configure and maintain the PTP-based clock distribution. For example, best master clock algorithm (BMCA) uses PTP announce messages to determine the configuration of the master-slave hierarchy in a network, and to select the grandmaster.

Figure 2:
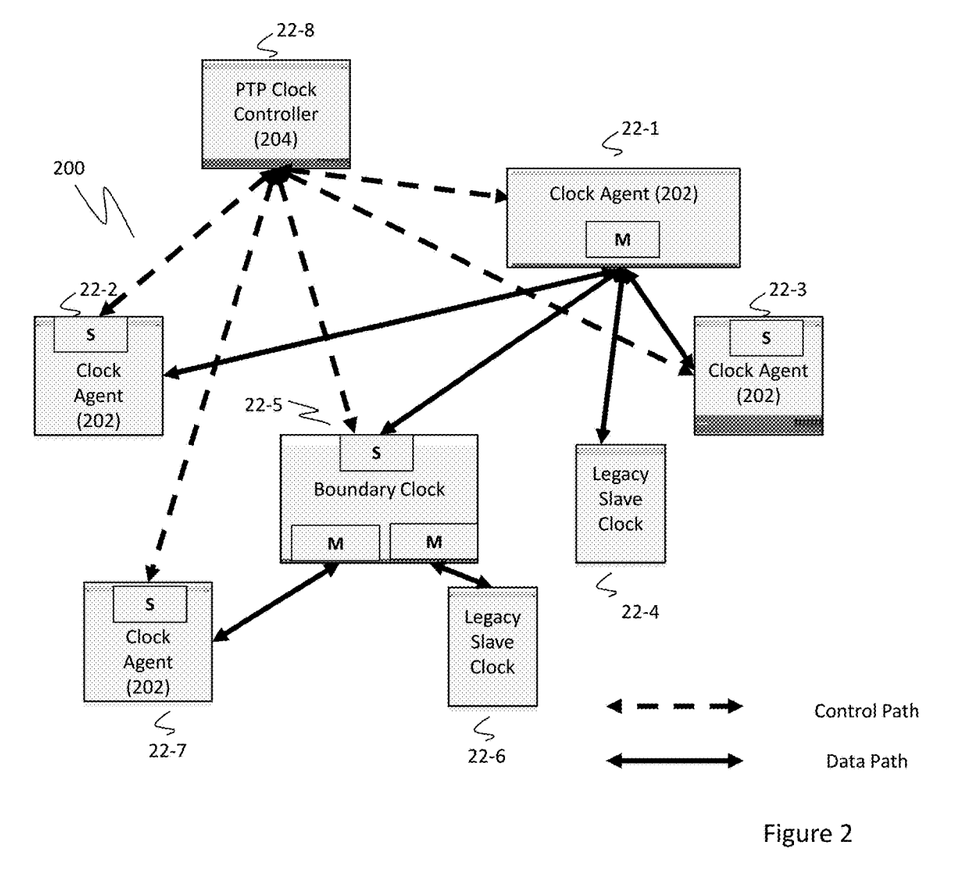
FIG. 2 illustrates a generalized schematic architecture of an exemplary time distribution network implementing the Precision Time Protocol (PTP) in accordance with certain embodiments of the presently disclosed subject matter.

Referring to FIG. 2, there is illustrated a generalized schematic architecture of an exemplary time distribution network 200 (referred to hereinafter also as "clock network") implementing the Precision Time Protocol (PTP) in accordance with certain embodiments of the presently disclosed subject matter.

For purpose of illustration, network 200 resides on the same underlying communication network as time distribution network 100 illustrated in FIG. 1a. Node 22-1 is currently configured to be the source of a synchronization reference, i.e. to serve as master node and end nodes 22-2-22-7 are configured to be the destinations of a synchronization reference, i.e. to operate as PTP slave nodes. However, unlike the prior art solutions, legacy clocks residing on, at least, part of the nodes are replaced by PTP clock agents 202, each PTP clock agent being in data communication with computer-based PTP clock controller 204. Such PTP clock agents (also referred to hereinafter as "clock agents") are referred to hereinafter as "slave clock agents" when operating in a slave mode and "master clock agents" when operating in a master mode. It is noted that in the following description a clock agent residing on a boundary clock is referred to hereinafter as "slave clock agent" with regard to operating via a slave port and as "master clock agent" with regard to operating via a master port. PTP clock controller can be located at a management network node (denoted 12-8) or on another suitable network node.

As illustrated, clock agents reside on nodes 22-1, 22-2, 22-3, 22-5 and 22-7, while they operate in a slave mode on nodes 22-2, 22-3 and 22-7, in boundary mode on node 22-5 and in master mode on node 22-1.

As illustrated, network 200 is a mixed time distribution network comprising clock agents configured in accordance with certain embodiments of the currently presented subject matter along with legacy PTP clocks. Legacy clocks have no data communication with the PTP controller via the control path, however can communicate with the controller via peering clock agents.

Nodes 22-4 and 22-6 are illustrated as bearing legacy PTP clocks operating in slave mode.

Clock agents and legacy clocks are configured to use data path (illustrated as bold arrows) to exchange PTP synchronizing messages (e.g. SYNC, SYNC FOLLOW UP, DELAY RESPONSE, and DELAY FOLLOW UP) in a manner detailed with reference to FIG. 1. Clock agents and legacy clocks are further configured to use the data path to exchange PTP announce and signaling messages.

As illustrated in FIG. 2, clock agents are further operatively connected to PTP clock controller via control path (illustrated as dashed arrows). Slave clock agents are configured to use control path to forward to PTP clock controller timestamp-related data. As will be further detailed with reference to FIG. 3a-3c, PTP clock controller 204 is configured to generate clock-recovery control data in accordance with timestamp-related data it receives. PTP clock controller is configured to use the control path to forward to slave control agents respectively generated clock-recovery control data. Clock agents and PTP clock controller can further use the control path for exchanging PTP announce and signaling messages as well as for exchanging proprietary commands. It is noted that PTP controller can exchange messages and commands with a clock agent when the agent operates in slave, master or boundary mode.

Figure 3A:
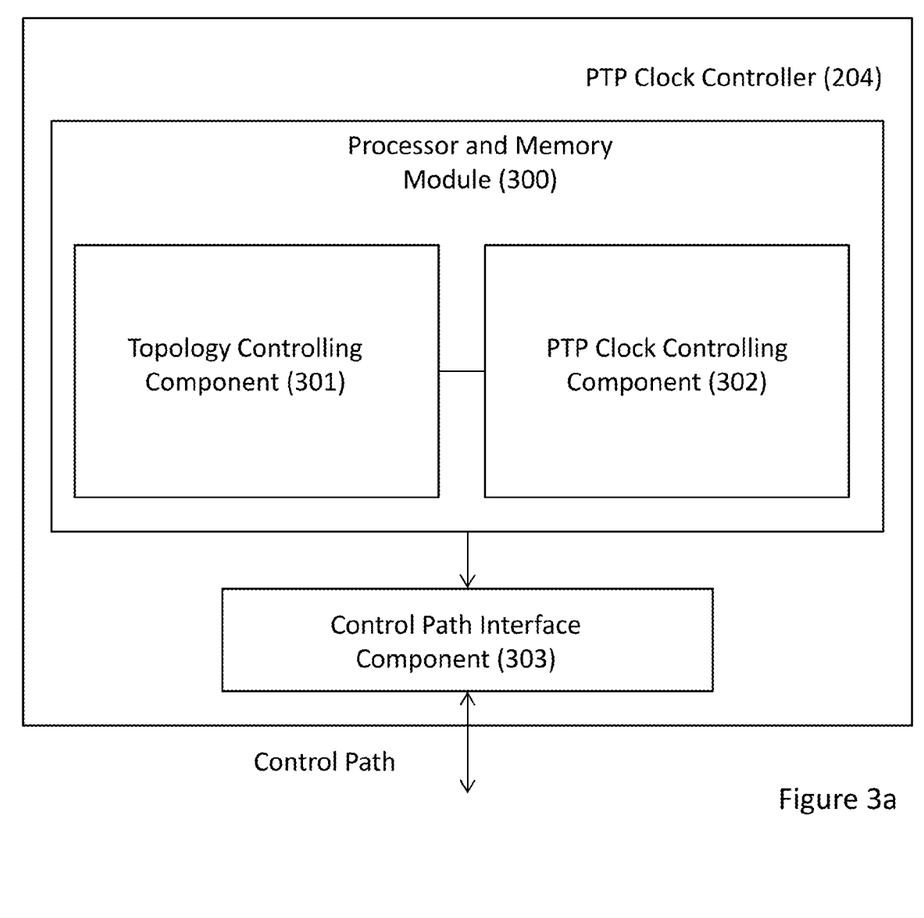
FIG. 3a illustrates a generalized functional block diagram of a PTP clock controller in accordance with certain embodiments of the presently disclosed subject matter.

As illustrated in FIG. 3a, PTP clock controller comprises processor and memory module 300 operatively connected to control path interface component 303. Control path interface component is a hardware-implemented component configured to enable data communication with clock agents via the control path.

Processor in the module 300 can be configured to execute several functional components in accordance with computer-readable instructions implemented in the memory of the module 300. Such functional components are referred to hereinafter as comprised in the processor and memory module. The processor and memory module 300 comprises a topology controlling functional component 301 and PTP clock controlling functional component 302.

Figure 3B:
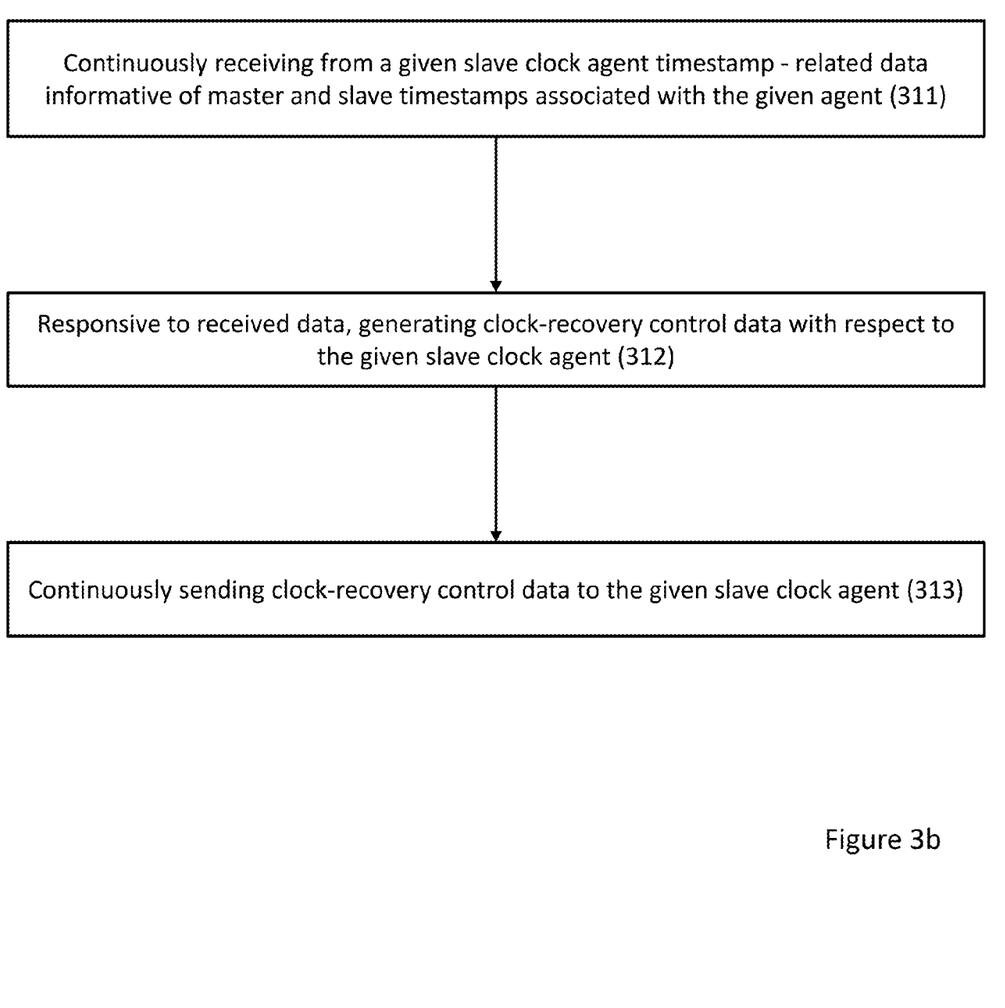
FIG. 3b illustrates a generalized flow chart of operating PTP clock controller in accordance with certain embodiments of the presently disclosed subject matter.
Figure 3C:
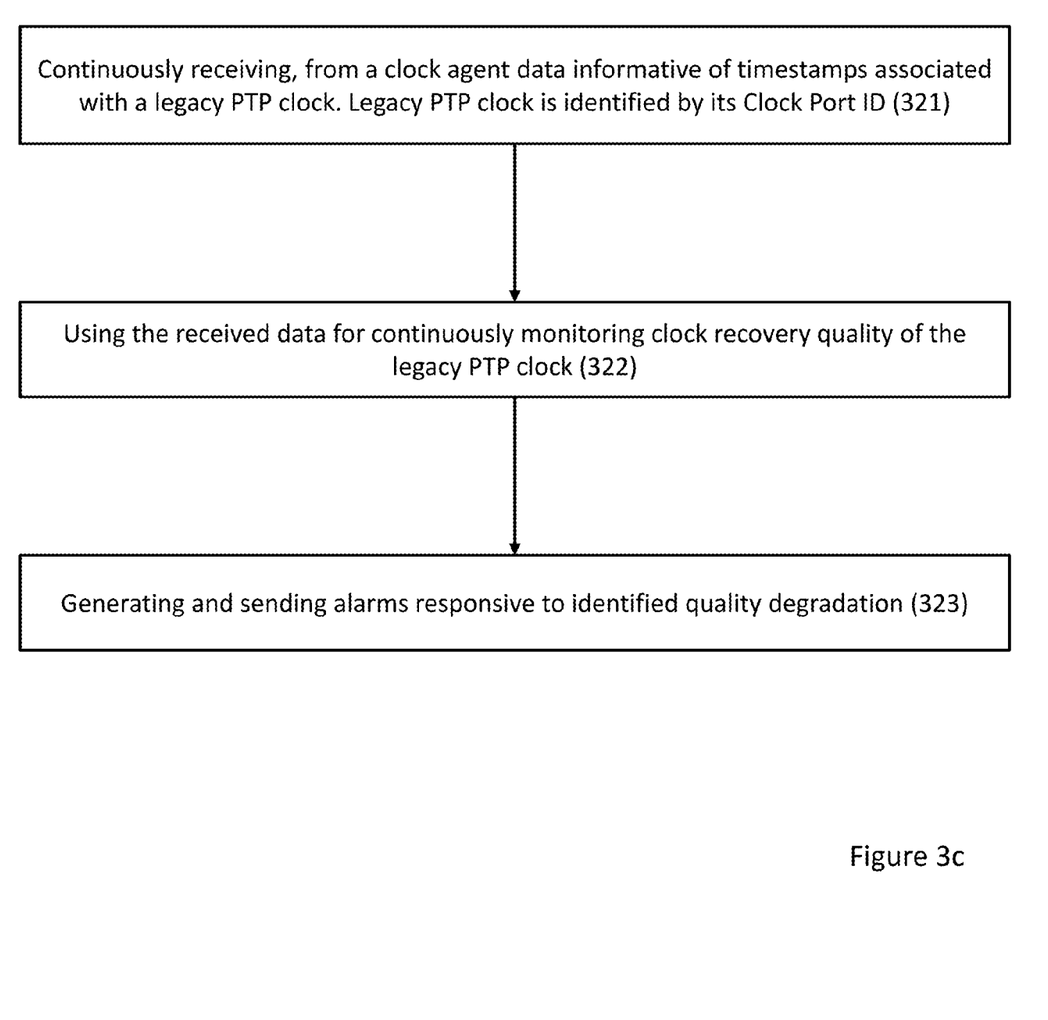
FIG. 3c illustrates a generalized flow chart of further operating PTP clock controller in a mixed time distribution network in accordance with certain embodiments of the presently disclosed subject matter.

PTP clock controlling component 302 is configured to enable operating PTP clock controller as illustrated in FIGS. 3b and 3c.

As illustrated in FIG. 3b, PTP clock controller continuously receives (311) from each given slave clock agent timestamp-related data informative of master and slave timestamps associated with the given agent; it then uses the received data to generate (312) clock-recovery control data with respect to each given slave clock agent; and continuously sends (313) the generated clock-recovery control data to respective slave clock agents.

Unless specifically stated otherwise, it is appreciated that throughout the specification the terms "continuously receiving information (and/or data)" and "continuously sending information (and/or data)" refer to receiving (in push or pull mode) respective information substantially each time new information is available.

Depending on configuration of a given clock agent and/or communication therewith, timestamp-related data can be available to PTP controller in accordance with predefined receiving criteria (which, for example, relates to data exchange schedule (e.g. every minute), buffer size for collecting timestamp-related data by the agent, external events, BMC algorithm configuration, etc.). Likewise, depending on configuration of PTP controller (including an implemented algorithm of calculating clock-recovery control data) and/or communication therewith, clock-recovery control data can be configured as available to PTP controller in accordance with predefined sending criteria.

Recovery-related communication detailed with reference to FIG. 3b can be implemented in a proprietary form and can be provided via TCP or TCP/TLS transport layer with predefined TCP ports at PTP controller and respective slave clock agents. Each controller/agent communication message can be configured to include a header informative of message type (e.g. aggregated-timestamps, topology-control), subtype (e.g. sync, delay-req, force-clockclass), clock port ID and clock agent ID followed by message data and optional TLV (type-length-value) fields.

Optionally, PTP controller can also monitor clock recovery quality of legacy PTP clocks (e.g. illustrated as residing on nodes 22-4 and 22-6) exchanging synchronizing messages with a peer clock agent.

In accordance with certain embodiments of the presently disclosed subject matter, clock agent is configured to receive data informative of the timestamps from the respective legacy PTP clock. Clock agent is further configured to transfer the received data to PTP controller in specially configured messages. Likewise detailed with reference to FIG. 3b, recovery-related communication can be implemented in a proprietary form and can be provided via TCP or TCP/TLS transport layer with predefined TCP ports at PTP controller and respective clock agents. The messages can be configured to include a header informative of that the message is the "aggregated-timestamps" message specifying the legacy clock port as its port ID.

As illustrated in FIG. 3c, PTP controller continuously receives (321) from clock agent data informative of the timestamps associated with one or more peer legacy slave clocks (e.g. with clock port IDs of respective legacy PTP clocks); it uses the received data for continuously monitoring (322) clock recovery quality of the legacy PTP clocks; and, optionally, generates and sends (323) alarms (e.g. to a network management system) responsive to identified quality degradation (e.g. when clock quality calculated based on the received data does not meet predefined quality criteria).

When, resulting from re-configuration of the clock hierarchy, the legacy PTP clock starts to exchange synchronizing messages with legacy master clock, PTP controller stops monitoring said legacy clock and can, optionally, issue notification that the quality of the respective slave clock is unmonitored.

In accordance with certain embodiments of the currently presented subject matter, PTP clock controller can be further configured to enable dynamic building of the clock hierarchy.

Additionally to exchanging PTP announce messages with other clock agents and legacy clocks in the network, clock agents can be configured to send the same PTP announce messages to PTP controller via the control path. Further, clock agents can be configured to forward to PTP controller announce messages received from legacy PTP clocks. It is noted that data communicated from a legacy clock to a peering clock agent can be informative about clock recovery condition of the legacy clock itself as well as of its legacy peers having no direct connections to the clock agent.

PTP controller continuously receives PTP announce messages from clock agents (including, when relevant, also announce messages forwarded from the legacy clocks), each announce message associated with respective clock port IDs. Topology controlling component 301 processes the collected PTP announce messages along with clock/phase recovery information provided by PTP clock controlling component 302 with respect to clock agents and legacy clocks and, optionally, along with information about predefined network topology. Thus, topology controlling component 301 uses techniques defined by BMCA protocol to continuously generate a clock hierarchy and to define a clock distribution topology to be implemented. Topology controlling component can further enforce the desired topology by sending to clock agents resulting configuration commands specifying quality and priority of respective PTP ports. Clock agents are configured to change the status of respective ports in accordance with the received commands.

Information of quality and priority of clock agents (as configured by the PTP controller) is transferred to the legacy clocks by the announce messages. A legacy clock can use BMCA to set role of its PTP ports based on the information received in respective announce messages. Further, when configuration requires so, PTP controller can set priority of a port of a clock agent in accordance with priority of a peer legacy clock port (e.g. lower than priority of the legacy clock port).

In accordance with certain embodiments of the currently disclosed subject matter, PTP controlling component 302 can be further configured to use the received timestamp-related data to calculate proprietary clock-recovery accuracy metrics of different clock nodes and provide them to topology controlling component 301 (or, optionally, to a separate server enabling centralized topology management of the clock network). The calculated accuracy metrics can be usable in configuration calculations instead of master-clock-depending clock-class assigned to the respective clock nodes.

Figure 4A:
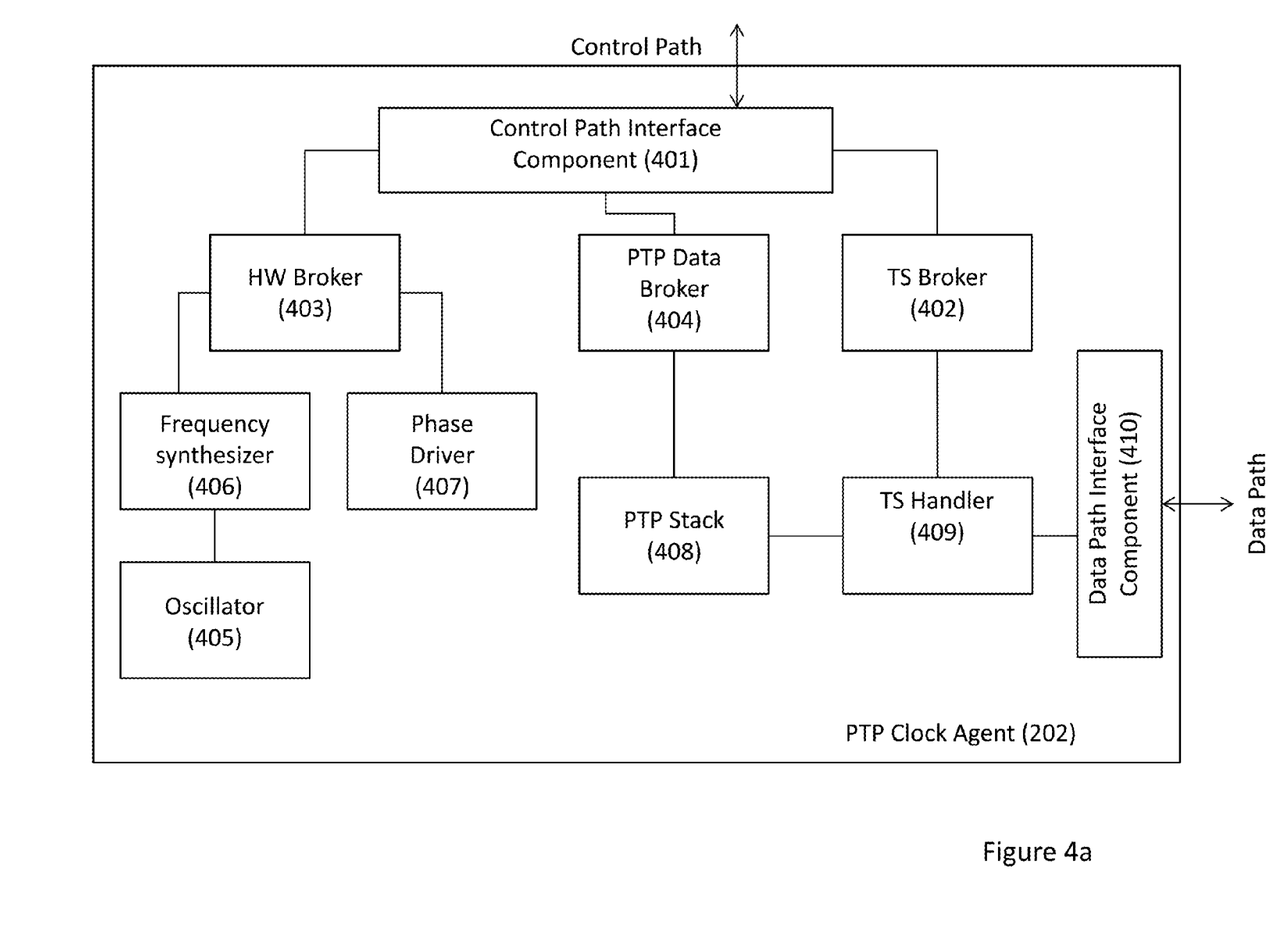
FIG. 4a illustrates a generalized functional block diagram of a PTP clock agent in accordance with certain embodiments of the presently disclosed subject matter.

Referring now to FIG. 4a, there is illustrated a generalized functional block diagram of a PTP clock agent in accordance with certain embodiments of the presently disclosed subject matter.

PTP clock agent comprises a hardware-implemented control path interface component 401 configured to enable data communication from a given clock port via a control path, and a hardware-implemented data path interface component 410 configured to enable data communication via the data path.

PTP clock agent further comprises hardware (HW) broker 403 operatively connected to control path interface component.

HW broker is configured to process clock-recovery control data received from the PTP controller via the control path interface and to extract data usable for phase and frequency control (e.g. informative of fractional frequency offset (FFO), time error TE, etc.). HW broker is operatively connected to phase driver 407 and frequency synthesizer 406, and is further configured to drive phase driver 407 and frequency synthesizer 406 in accordance with the extracted data. In slave mode, phase driver 407 is configured to set phase recovered data based on the control data extracted by HW broker. In slave mode, frequency synthesizer 406 is configured to use control data extracted by HW broker to steer frequency signal received from oscillator 405 and to output recovered frequency. In master mode, frequency synthesizer 406 and phase driver 407 are not managed by the HW broker 403 and operate in accordance with phase/frequency related data received from an external source (e.g. GPS clock). Frequency synthesizer 406 and phase driver 407 are further configured to drive timestamp generator (not shown) which is configured to provide precise timestamping of the PTP messages. Aside from the source of clock-recovery control data, in both modes frequency synthesizer 406, phase driver 407 and timestamp generator can operate in the same manner as they operate in a legacy clock.

PTP clock agent further comprises timestamp (TS) handler 409 operatively connected to data path interface component 410 and configured to extract timestamp information from PTP messages received via data path and inject timestamp information into PTP messages generated by the PTP Stack 408.

TS handler 409 is operatively connected to timestamp (TS) broker 402. TS broker 402 is operatively connected to control path interface component 401 and is configured to aggregate the extracted timestamps along with sequence number in respective PTP session and, thereby, generate synchronizing messages to be sent to the PTP controller via component 401. The synchronizing messages are informative of timestamp-related data associated with the agent and are detailed with reference to FIG. 3b. TS broker 402 is further configured to enable transmitting the generated messages to PTP clock controller via interface component 401.

It is noted, that, when operating in a mixed time distribution network as detailed with reference to FIG. 3b, TS handler 409 can be configured to extract timestamp-related data from PTP messages received from legacy PTP clocks, and TS broker 402 can be configured to generate messages to be sent to the PTP controller, the messages being informative of timestamps associated with respective clock port IDs of legacy clocks.

TS handler 409 is further operatively connected to PTP stack module 408. Likewise in a legacy PTP clock, PTP stack module 408 receives, processes and generates PTP messages. Data path interface component 410 enables exchange of PTP messages with other PTP clocks. Optionally, PTP stack module 408 can be further configured to transmit the received announce messages to PTP data broker 404.

PTP data broker 404 is operatively connected to control path interface component 401 and configured to enable exchange of announce messages with PTP controller via control path interface component 401.

It is noted that in a boundary clock the PTP clock agent can be configured to operate in a master mode with respect to a certain clock port whilst operating in a slave mode with respect to other clock port(s).

Figure 4B:
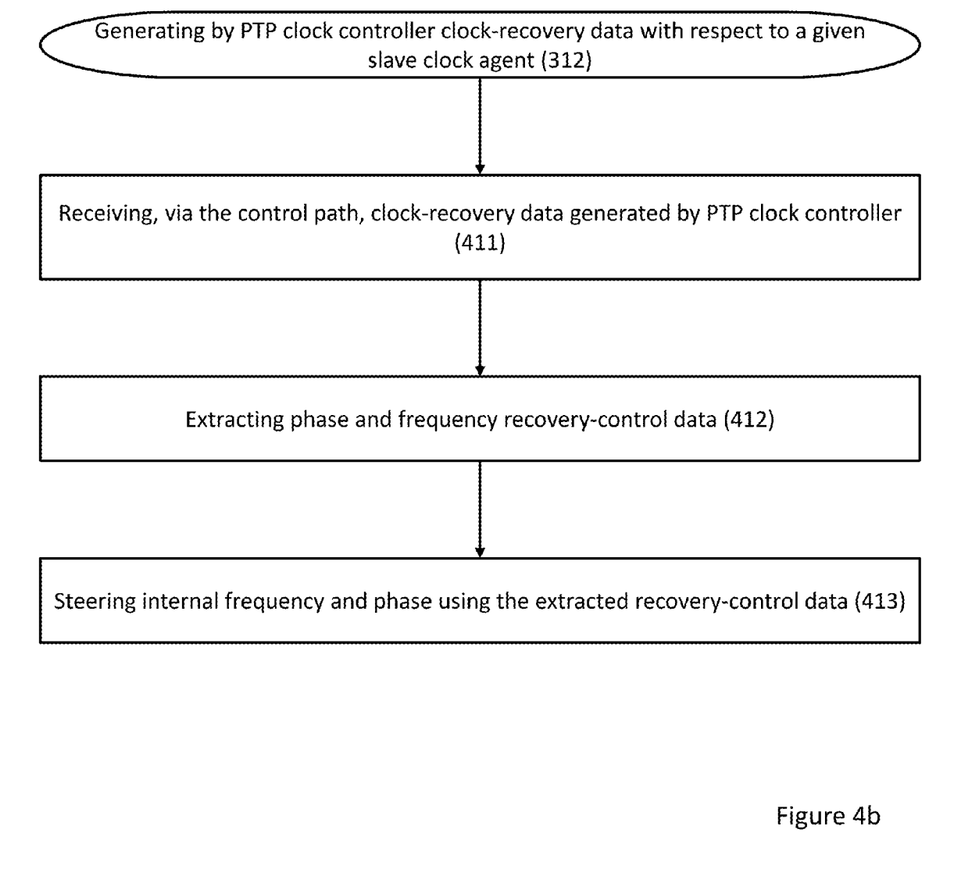
FIGS. 4b-4c illustrate generalized flow charts of operating a PTP clock agent in accordance with certain embodiments of the presently disclosed subject matter.
Figure 4C:
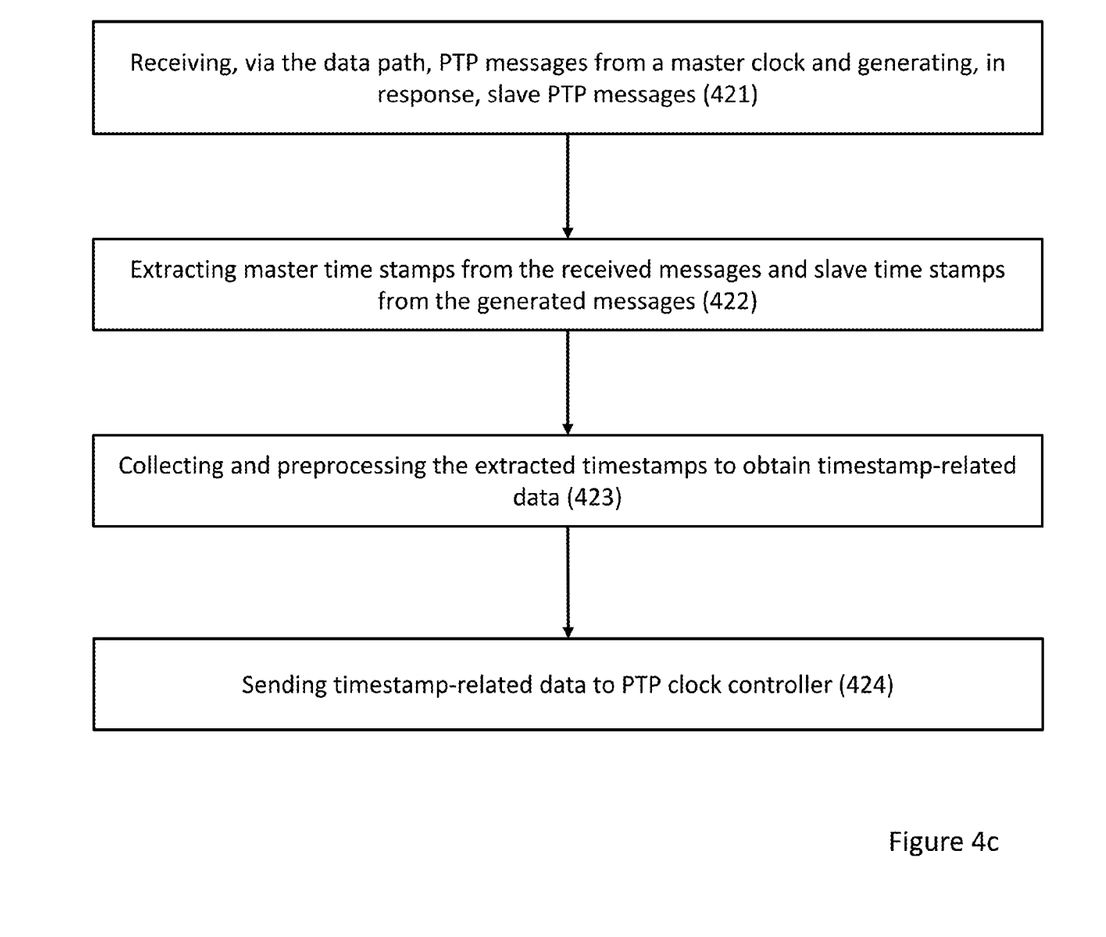

Operating the PTP clock agent in a slave mode is further detailed in FIGS. 4b-4c.

As illustrated in FIG. 4b, a given PTP clock agent receives (411), via the control path, clock-recovery control data generated by PTP clock controller with respect to the given PTP clock agent; extracts (412) data usable for control of phase and frequency recovery (referred to hereinafter as recovery-control data); and steers internal frequency and phase using the extracted recovery-control data (413).

As illustrated in FIG. 4c, in parallel to the process illustrated in FIG. 4b and independently thereof, PTP clock agent receives, via the data path, PTP messages from a master clock and generates (421), in response, slave PTP messages. PTP clock agent further extracts (422) master timestamps from the received messages and slave timestamps from the generated messages; collects and preprocesses the extracted timestamps to obtain (423) timestamp-related data; and sends (424) messages informative of timestamp-related data to PTP clock controller.

Those versed in the art will readily appreciate that the teachings of the presently disclosed subject matter are not bound by PTP clock controller and clock agent illustrated in FIGS. 3a and 4a; equivalent and/or modified functionality can be consolidated or divided in another manner and can be implemented in any appropriate combination of software, firmware and hardware.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. A method of operating a computer-based controller being in data communication with one or more first computer-based clock nodes via a control path, the one or more first clock nodes operating in a time distribution network (TDN) operating in compliance with a time-transfer protocol, the method comprising:
continuously receiving, by the controller via the control path from each of the one or more first clock nodes, first timestamp-related data, the first timestamp-related data received from a given clock node being informative of master and slave timestamps associated with the given clock node;
using the received first timestamp-related data associated with a given clock node to generate, for each of the one or more clock nodes, clock-recovery control data with respect to the given clock node, the generated clock-recovery control data comprising data usable for phase and frequency recovery;
continuously sending the generated clock-recovery control data, via the control path, to each of the one or more clock nodes;
continuously receiving, by the controller via the control path from each of the one or more first clock nodes, first PTP announce messages generated by the one or more first clock nodes, each first PTP announce message associated with a clock port of respective first clock node;
processing, at least, the received first PTP announce messages using techniques defined by BMCA (Best Master Clock Algorithm) protocol to continuously generate a clock distribution topology to be implemented; and
sending to the one or more first clock nodes configuration commands specifying quality and priority of respective PTP ports in accordance with the generated clock distribution topology.

2. The method of claim 1, further comprising:
continuously receiving, by the controller via the control path from the one or more first clock nodes, second timestamp-related data, the second timestamp-related data received from a given first clock node being informative of master and slave timestamps associated with a second clock node operating in the TDN with no direct data communication with the controller via the control path, wherein the second timestamp-related data are generated by the given first clock node using PTP synchronizing messages it receives from the second clock node; and
continuously monitoring, by the controller, clock recovery quality of the second clock node using the received second timestamp-related data.

3. The method of claim 2, further comprising processing timestamp-related data received by the controller to generate clock-recovery accuracy metrics of the one or more first clock nodes and one or more second clock nodes.

4. The method of claim 1, further comprising processing timestamp-related data received by the controller to generate clock-recovery accuracy metrics of the one or more first clock nodes.

5. The method of claim 1, further comprising:
when the TDN comprises one or more second clock nodes operating in the TDN with no direct connection with the controller via the control path, continuously receiving, by the controller via the control path from the one or more first clock nodes, second PTP announce messages generated by the one or more second clock nodes being in data communication with the one or more first clock nodes via a data path, each second PTP announce message associated with a clock port of respective second clock node; and
continuously generating the clock distribution topology using processing the received first PTP announce messages together with the received second PTP announce messages.

6. The method of claim 1, wherein continuously generating the clock distribution topology further comprises processing timestamp-related data received by the controller and/or data informative of predefined network topology and/or the clock-recovery accuracy metrics generated by the controller.

7. A computer-based controller configured to operate in a time distribution network (TDN) operating in compliance with a time-transfer protocol and comprising one or more first clock nodes being in data communication with the controller via a control path, the controller configured to:
continuously receive from each of the one or more first clock nodes first timestamp-related data, wherein the first timestamp-related data received from a given clock node are informative of master and slave timestamps associated with the given clock node;
for each of the one or more clock nodes, use the received first timestamp-related data associated with a given clock node to generate clock-recovery control data with respect to the given clock node, the generated clock-recovery control data comprising data usable for phase and frequency recovery of the given node;
continuously send to each of the one or more clock nodes the respectively generated clock-recovery control data;
continuously receive from each of the one or more first clock nodes first PTP announce messages generated by the one or more first clock nodes, each first PTP announce message associated with a clock port of respective first clock node;
process, at least, the received first PTP announce messages using techniques defined by BMCA (Best Master Clock Algorithm) protocol to continuously generate a clock distribution topology to be implemented; and
send to the one or more first clock nodes configuration commands specifying quality and priority of respective PTP ports in accordance with the generated clock distribution topology.

8. The controller of claim 7, further configured:
continuously receive from a first clock node second timestamp-related data, the second timestamp-related data received from the first clock node being informative of master and slave timestamps associated with a second clock node operating in the TDN with no direct data communication with the controller via the control path, wherein the second timestamp-related data are generated by the first clock node using PTP synchronizing messages it receives from the second clock node; and
continuously monitoring, by the controller, clock recovery quality of the second clock node using the received second timestamp-related data.

9. The controller of claim 8, further configured to process timestamp-related data received by the controller to generate clock-recovery accuracy metrics of the one or more first clock nodes and one or more second clock nodes.

10. The controller of claim 7, further configured to process timestamp-related data received by the controller to generate clock-recovery accuracy metrics of the one or more first clock nodes.

11. The controller of claim 7, further configured:
when the TDN comprises one or more second clock nodes operating in the TDN with no direct connection with the controller via the control path, to continuously receive via the control path from the one or more first clock nodes, second PTP announce messages generated by the one or more second clock nodes being in data communication with the one or more first clock nodes via a data path, each second PTP announce message associated with a clock port of respective second clock node; and
to process the received first PTP announce messages together with the received second PTP announce messages to continuously generate the clock distribution topology.

* * * * *